United States Patent [19]

Coultas

[11] 4,052,999

[45] Oct. 11, 1977

[54] BUMPER WALL FOR PLASMA DEVICE

[75] Inventor: Thomas A. Coultas, Hinsdale, Ill.

[73] Assignee: The United States of America as represented by the United States Energy Research and Development Administration, Washington, D.C.

[21] Appl. No.: 596,043

[22] Filed: July 15, 1975

[51] Int. Cl.² .............................................. F16L 9/10
[52] U.S. Cl. .................................. 138/158; 138/159
[58] Field of Search ............... 250/519, 515, 517, 518; 176/1, 87; 313/231.4; 138/118, 128, 159, 160, 177, 157, 161, 158

[56] References Cited

U.S. PATENT DOCUMENTS

| 1,959,756 | 5/1934 | Ferm | 138/157 |
|---|---|---|---|
| 3,044,499 | 7/1962 | Frerich | 138/149 X |
| 3,273,599 | 9/1966 | Heeren | 138/38 |
| 3,286,094 | 11/1966 | Pretto | 250/519 |
| 3,403,807 | 10/1968 | Hawgood et al. | 176/87 X |
| 3,421,977 | 1/1969 | Hutchinson et al. | 176/87 X |
| 3,528,495 | 9/1970 | Armstrong et al. | 176/87 X |
| 3,568,723 | 3/1971 | Sowards | 138/177 X |
| 3,578,075 | 5/1971 | Winter | 138/177 X |

FOREIGN PATENT DOCUMENTS

| 92,716 | 10/1922 | Austria | 138/161 |
|---|---|---|---|
| 1,514,528 | 6/1969 | Germany | 250/518 |

Primary Examiner—Charles E. Phillips
Attorney, Agent, or Firm—Dean E. Carlson; Frank H. Jackson; Donald P. Reynolds

[57] ABSTRACT

Operation of a plasma device such as a reactor for controlled thermonuclear fusion is facilitated by an improved bumper wall enclosing the plasma to smooth the flow of energy from the plasma as the energy impinges upon the bumper wall. The bumper wall is flexible to withstand unequal and severe thermal shocks and it is readily replaced at less expense than the cost of replacing structural material in the first wall and blanket that surround it.

4 Claims, 5 Drawing Figures

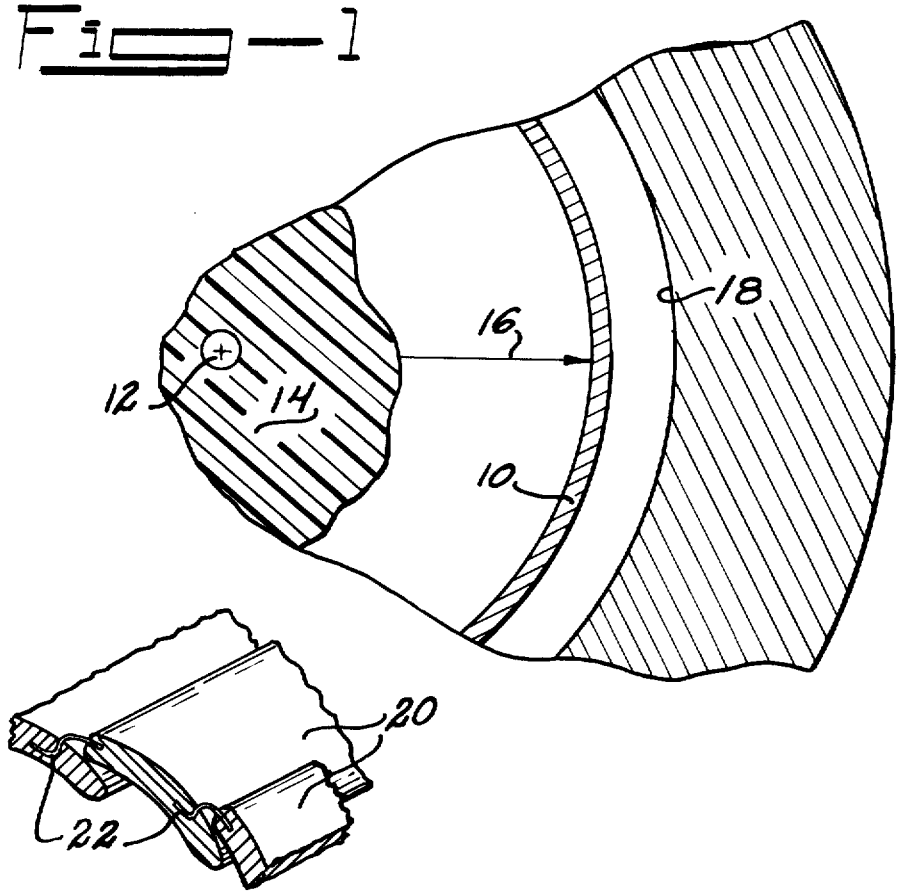
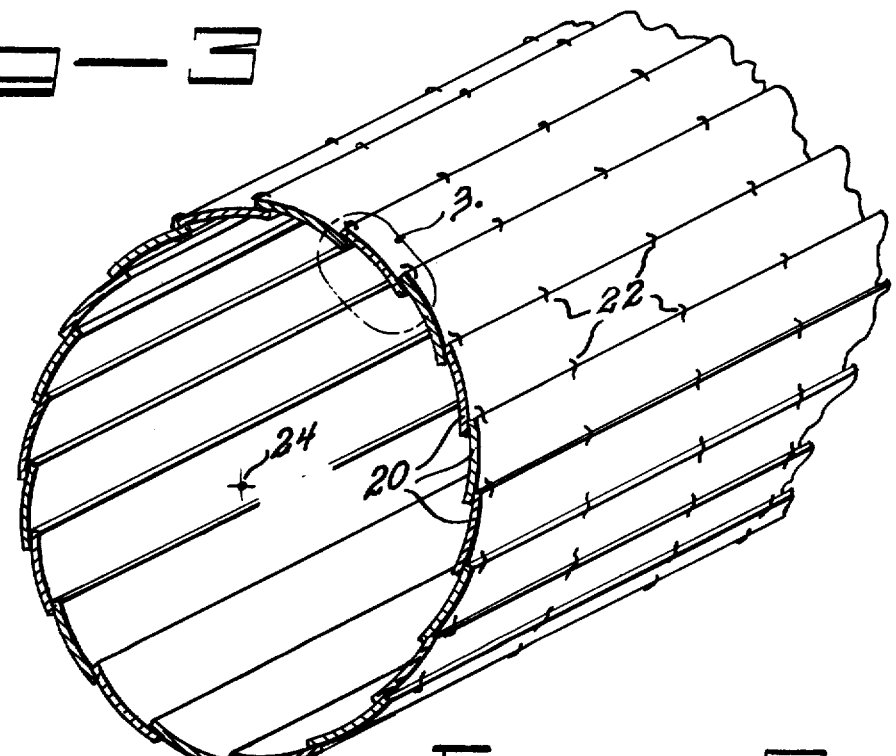

BUMPER WALL FOR PLASMA DEVICE

CONTRACTUAL ORIGIN OF THE INVENTION

The invention described herein was made in the course of, or under, a contract with the U.S. Energy Research and Development Administration.

BACKGROUND OF THE INVENTION

This invention relates to an improvement in the design of plasma devices. In particular, it is useful in reactors designed to effect controlled thermonuclear fusion.

The design of a reactor for containing and utilizing controlled thermonuclear fusion must include a means of solving the problem created by the intense and high-speed temperature pulse that proceeds radially outward from the plasma of a fusion reaction. The geometric decrease in energy density with distance makes it appealing to space components as far as possible from the site of a fusion reaction. However, it is often necessary to place components, for such purposes as containment, cooling channels, and implosion, in relatively close proximity to the fusion reaction.

The present approach to controlled thermonuclear fusion envisions the introduction of a relatively small volume of gas or solid pellets of a fusionable material into a reaction location. Fuel is typically a mixture of deuterium and tritium, introduced and ignited into fusion by means such as a laser pulse, an intense electron or ion beam or a wave from a magnetic implosion coil. Whatever the ignition means, it must be sufficiently close to the fuel to ignite the fusion reaction and it must thereafter be protected sufficiently from the plasma resulting from that reaction sufficiently so that it can function again with succeeding charges. The igniting or containing mechanism or both need protection from the pulse that follows ignition of the fusion reaction, and the plasma must be protected from contamination due to sputtering.

It is an object of the present invention to improve the operation of devices containing plasmas.

It is a further object of the present invention to provide a protective barrier between components on the inside of a plasma device designed for controlled thermonuclear fusion and the plasma pulse associated with the fusion reaction.

It is a further object to provide a dummy wall in a fusion reactor to absorb the energy pulse from the fusion reaction.

It is a further object of the present invention to provide a bumper wall to serve as readily replaceable inner wall in a plasma device.

It is a further object to protect a plasma from atoms of high atomic number that may be sputtered or otherwise released into the plasma.

Other objects will become evident in the course of a detailed description of the invention.

SUMMARY OF THE INVENTION

Operation of a plasma device such as a reactor for controlled thermonuclear fusion is improved by the use of an improved bumper wall to absorb the energy pulse from the fusion reaction and thereby protect containing walls and outer structure from the energy pulse and also protect the plasma from contamination by sputtered atoms. The bumper wall is flexible to better withstand thermal shock and is designed to tolerate large amounts of heat.

BRIEF DESCRIPTION OF THE DRAWINGS

FIG. 1 is a sectional view through a portion of a typical plasma device.
FIG. 2 is an expanded view of a bumper for use in FIG. 1.
FIG. 3 is a detailed view of a portion of FIG. 2.

DETAILED DESCRIPTION OF THE INVENTION

Figure 4:
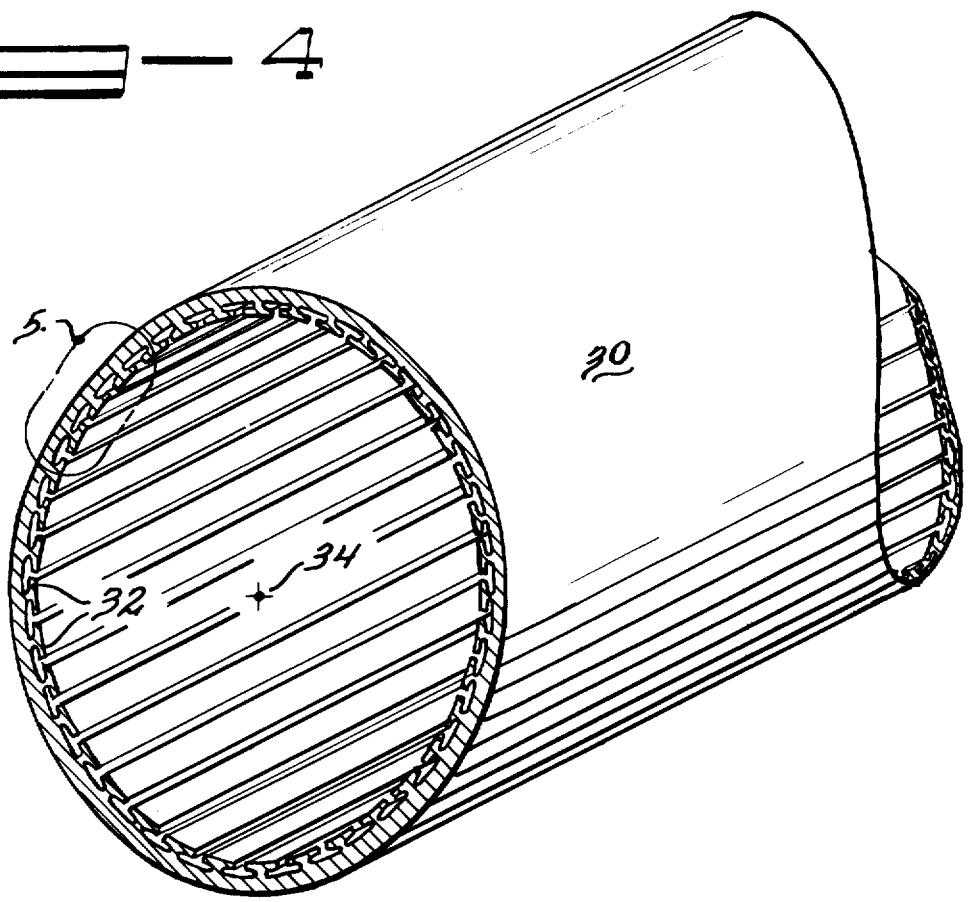
FIG. 4 is an alternate embodiment of the bumper of FIG. 1.

FIG. 1 is a schematic partial cross-sectional view of a portion of a typical plasma device designed for controlled thermonuclear fusion. FIG. 1 is taken to show circular symmetry in section. It may relate to a spherical reaction chamber where a pellet is ignited by a laser or an electron beam. Alternatively, it may represent a cylindrical section that is typical of theta-pinch reactors. Finally, it may represent a portion of a cross section of a toroid that is characteristic of reactors of the Tokamak type. In FIG. 1, bumper wall 10 is a relatively thin wall that surrounds site 12 where a fusion reaction has been ignited. The reaction generates plasma 14 which moves radially in the direction of arrow 16. Bumper wall 10 is disposed between the traveling plasma 14 and components 18 which may include a liquid- or gas-cooled blanket and magnetic coils for containment, implosion, direct electrical conversion, or a combination thereof. In general, components 18 are expensive to build and difficult to replace. Bumper wall 10 can be made to be relatively cheap to install and easy to replace. Bumper wall 10, as will be seen, can also be made to be flexible, to absorb the varying forces resulting from non-uniformity of the incidence of the shock and thermal wave of plasma 14 on bumper wall 10. The result is that bumper wall 10 is a sacrificial protective surface for components 18.

Turning to a closer view of bumper wall 10 of FIG. 1, FIG. 2 shows a view of a typical radiation-cooled bumper wall and FIG. 3 is an expanded view of a portion of FIG. 2 showing details of construction. In FIGS. 2 and 3, strips 20 are portions of a refractory insulating material such as alumina having a thickness of the order of a millimeter or less. Each strip 20 overlaps the next adjacent strip as in a Venetian blind and is attached thereto by embedded wire 22 to create a structure that exposes only the refractory material to the center 24 where a fusion reaction is to take place. The wires 22 permit the strips 20 to move with respect to one another in response to the incidence of a traveling shock or thermal wave of plasma from center 24. Strips 20 are capable of withstanding a high temperature and, in the normal operation envisioned for fusion reactors, will have time between fusion reactions to become cooled by radiation of the heat at a rate below that at which they were heated.

Figure 5:
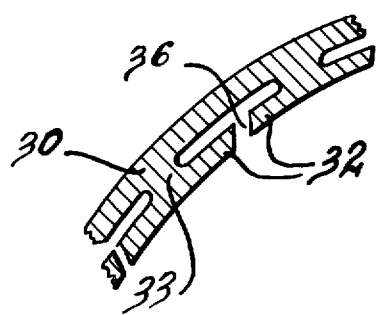
FIG. 5 is a detailed view of a portion of FIG. 4.

FIGS. 4 and 5 show as an alternate embodiment a conduction-cooled bumper wall. FIG. 4 is an overall view of a bumper wall in section and FIG. 5 is an expanded view of a portion of FIG. 4. In FIGS. 4 and 5, support 30 is a solid structure that both provides physical support for strips 32 through webs 33 and also serves as a heat conductor for collecting and transmitting heat that proceeds from center 34 and is intercepted by strips 32 and conducted through webs 33. Adjacent strips 32 are separated by cut 36 that is placed at an angle to a radius from center 34 so that strips 32 shadow from a plasma at center 34. Cuts 36 provide flexibility so that strips 32 can bend or ripple about webs 33 in response to thermal stresses resulting from incident thermal shocks or thermal waves. As with FIGS. 2 and 3, FIGS. 4 and 5 may represent equally well a section of a spherical reaction chamber for the fusion of a pellet to be ignited by a laser pulse or an electron beam, or a cylindrical chamber as in the theta-pinch reactor, or a toroidal chamber as in a Tokamak. For any of these, strips 32 are disposed to receive the shock wave or thermal wave from the plasma emanating from center 34. Strips 32 are alumina or other refractory material and are of the order of 1 mm in thickness.

The construction indicated in FIGS. 2, 3, 4 and 5 for a bumper wall has the following advantages. The bumper wall absorbs high-temperature pulses such as those resulting from a fusion reaction. Being free to expand and to slide and ripple with respect to portions of itself, the bumper wall experiences low thermal stresses on the impact of such a temperature pulse. The bumper wall is typically cheaper to repair and replace than its surrounding components such as implosion coils, focusing coils and blankets. As another advantage the bumper wall will be at temperatures that have been calculated at up to 870° C. (1143 K) for DT pellets having diameters of 1 mm and fired at 1-second intervals. Under these conditions, the bumper wall would not during operation become cooler than 400° C. (673 K) and hence would be too hot to adsorb impurities on its surface. Thus, the central region of the reactor, which is typically operated at reduced pressures, would run little risk of contamination from the bumper wall.

Materials other than alumina that may be used for the bumper wall of the present invention include graphite, silicon carbide, and other refractory oxides. The only other operating consideration for selection of the material of the bumper wall is that it not exhibit long-term radioactivity as a result of incidence of the radiation or neutrons from a fusion reaction.

The embodiments of the invention in which an exclusive property or privilege is claimed are defined as follows 1. An improved bumper wall for placement about a region containing a plasma, the improved bumper wall comprising
    a plurality of strips of a refractory material, each of the strips overlapping a portion of the next of the strips to form an enclosed region partially surrounding the plasma region;
    a plurality of webs, each of the webs connected to one of the strips in an area less than the surface area of the strips; and
    an outer structure of circular cross-section connected in rigid engagement to each of the webs, wherein the strips may flex with respect to one another by bending of the webs.

2. The apparatus of claim 1 wherein the strips are alumina having a thickness of the order of 1 millimeter.

3. The apparatus of claim 1 wherein the strips are graphite having a thickness of the order of 1 millimeter.

4. The apparatus of claim 1 wherein the strips are silicon carbide having a thickness of the order of 1 millimeter.

* * * * *